US008790524B1

(12) United States Patent
Luo et al.

(10) Patent No.: US 8,790,524 B1
(45) Date of Patent: Jul. 29, 2014

(54) METHOD AND SYSTEM FOR PROVIDING A MAGNETIC RECORDING TRANSDUCER USING A LINE HARD MASK AND A WET-ETCHABLE MASK

(75) Inventors: Guanghong Luo, Fremont, CA (US); Danning Yang, Fremont, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 81 days.

(21) Appl. No.: 12/880,484

(22) Filed: Sep. 13, 2010

(51) Int. Cl.
*G11B 5/127* (2006.01)
*G11B 5/31* (2006.01)
*G11B 5/11* (2006.01)

(52) U.S. Cl.
CPC .............. *G11B 5/3116* (2013.01); *G11B 5/112* (2013.01)
USPC .................................. 216/22; 216/41; 216/67

(58) Field of Classification Search
CPC ............................... G11B 5/112; G11B 5/3116
USPC ..................................................... 216/22, 41
See application file for complete search history.

(56) References Cited

U.S. PATENT DOCUMENTS

| 5,438,747 | A | 8/1995 | Krounbi et al. |
|---|---|---|---|
| 5,867,890 | A | 2/1999 | Hsiao et al. |
| 5,874,010 | A | 2/1999 | Tao et al. |
| 6,043,960 | A | 3/2000 | Chang et al. |
| 6,472,107 | B1 | 10/2002 | Chan |
| 6,692,898 | B2 | 2/2004 | Ning |
| 6,729,014 | B2 | 5/2004 | Lin et al. |
| 6,737,281 | B1 | 5/2004 | Dang et al. |
| 6,861,177 | B2 | 3/2005 | Pinarbasi et al. |
| 6,862,798 | B2 | 3/2005 | Kruger et al. |
| 6,872,467 | B2 | 3/2005 | Qian et al. |
| 6,983,531 | B2 | 1/2006 | Horng et al. |
| 7,024,756 | B2 | 4/2006 | Le et al. |
| 7,070,698 | B2 | 7/2006 | Le |
| 7,120,988 | B2 | 10/2006 | Le et al. |
| 7,120,989 | B2 | 10/2006 | Yang et al. |
| 7,186,348 | B2 | 3/2007 | Chen et al. |
| 7,380,332 | B2 | 6/2008 | Bedell et al. |
| 7,441,325 | B2 | 10/2008 | Gao et al. |
| 7,464,457 | B2 | 12/2008 | Le et al. |
| 7,469,467 | B2 | 12/2008 | Gao et al. |
| 8,333,898 | B2 | 12/2012 | Brown et al. |
| 8,607,438 | B1 | 12/2013 | Gao et al. |
| 2001/0001256 | A1 | 5/2001 | Hsiao |
| 2004/0229430 | A1 | 11/2004 | Findeis et al. |
| 2005/0024779 | A1 | 2/2005 | Le et al. |
| 2005/0066517 | A1 | 3/2005 | Bedell et al. |
| 2005/0117251 | A1 | 6/2005 | Matono et al. |

(Continued)

*Primary Examiner* — Nadine Norton
*Assistant Examiner* — Mahmoud Dahimene

(57) ABSTRACT

A method and system for fabricating a magnetic transducer is described. The transducer has device and field regions, and a magnetoresistive stack. Hard mask layer and wet-etchable layers are provided on the magnetoresistive stack and hard mask layer, respectively. A hard mask and a wet-etchable mask are formed from the hard mask and the wet-etchable layers, respectively. The hard and wet-etchable masks each includes a sensor portion and a line frame. The sensor portion covers part of the magnetoresistive stack corresponding to a magnetoresistive structure. The line frame covers a part of the magnetoresistive stack in the device region. The magnetoresistive structure is defined in a track width direction. Hard bias material(s) are then provided. Part of the hard bias material(s) is adjacent to the magnetoresistive structure in the track width direction. The wet-etchable sensor portion and line frame, and hard bias material(s) thereon, are removed.

18 Claims, 17 Drawing Sheets

(56) References Cited

U.S. PATENT DOCUMENTS

| | | |
|---|---|---|
| 2005/0185332 A1 | 8/2005 | Hsiao et al. |
| 2005/0241140 A1 | 11/2005 | Baer et al. |
| 2005/0264949 A1 | 12/2005 | Gao et al. |
| 2006/0028762 A1 | 2/2006 | Gao et al. |
| 2006/0174474 A1 | 8/2006 | Le |
| 2006/0234483 A1 | 10/2006 | Araki et al. |
| 2006/0288565 A1 | 12/2006 | Le et al. |
| 2007/0026537 A1* | 2/2007 | Jiang et al. .................. 438/3 |
| 2007/0026538 A1 | 2/2007 | Jayasekara |
| 2007/0113395 A1 | 5/2007 | Dulay et al. |
| 2007/0183093 A1 | 8/2007 | Le et al. |
| 2007/0245544 A1 | 10/2007 | Allen et al. |
| 2007/0245545 A1 | 10/2007 | Pentek et al. |
| 2007/0258167 A1 | 11/2007 | Allen et al. |
| 2008/0072417 A1 | 3/2008 | Hsu et al. |
| 2009/0310256 A1* | 12/2009 | Albrecht et al. .............. 360/135 |
| 2010/0024201 A1 | 2/2010 | Le |

\* cited by examiner

METHOD AND SYSTEM FOR PROVIDING A MAGNETIC RECORDING TRANSDUCER USING A LINE HARD MASK AND A WET-ETCHABLE MASK

BACKGROUND

FIG. 1 depicts a conventional method 10 for fabricating a magnetoresistive sensor in magnetic recording technology applications. FIGS. 2-4 depict a conventional transducer 50 during fabrication using the method 10. FIGS. 2-4 are not to scale. The method 10 typically commences after a conventional magnetoresistive, or MR, stack has been deposited.

The conventional method 10 commences by providing a conventional hard mask layer, conventional pattern transfer layers, and a photoresist mask, via step 12. The conventional pattern transfer layers consist of a Cr layer and an antireflective coating (ARC) layer on the Cr layer. The conventional ARC layer aids in patterning of the conventional photoresist mask. The conventional photoresist mask has the desired pattern, which is transferred to the conventional ARC and Cr layers. The conventional photoresist mask covers the region from which the conventional magnetoresistive sensor is to be formed, as well as a line portion of the transducer distal from the sensor. However, part of the device region adjoining the magnetoresistive sensor is left uncovered.

FIG. 2 depicts plan and ABS views of the conventional transducer 50 after step 12 is performed. The conventional magnetoresistive stack 54 typically includes an antiferromagnetic (AFM) layer, a pinned layer, a nonmagnetic spacer layer, and a free layer. In addition, seed and/or capping layers may be used. The conventional magnetoresistive stack 54 resides on an underlayer 52, which may be a substrate. The conventional hard mask layer 56 is typically a material such as SiC or diamond-like carbon (DLC). The pattern transfer layers may be a hard mask layer 58 and an ARC layer 60. Also shown is the photoresist mask 62. The photoresist mask 62 includes a line frame portion 62L and a sensor portion 62S. Similarly, the hard mask layer 58 and ARC layer 60 include line frame portions 58L and 60L and sensor portions 58S and 60S.

A conventional hard mask is defined from the conventional hard mask layer 56, via step 14. Step 14 includes transferring the pattern from the conventional photoresist mask and pattern transfer layers. FIG. 3 depicts an ABS view of the conventional transducer 50 after step 14 is carried out. Thus, the conventional hard mask 56' has the pattern of the photoresist mask 62 and pattern transfer layers 58 and 60. Thus, the conventional hard mask 56' includes sensor portion 56S and line portion 56L. Note that in FIG. 3, the photoresist mask 62 and ARC layer 60 have been removed.

The magnetoresistive structure is defined, via step 16. Step 16 typically includes ion milling the transducer 50. Thus, the portion of the magnetoresistive stack 54 exposed by the conventional photoresist mask is removed. The magnetoresistive structure being defined may be a magnetoresistive sensor for a read transducer 50. In addition the Cr layer 58' is typically consumed during the milling process.

The hard bias material(s) are deposited, via step 18. In addition, seed and/or capping layers may be provided in step 18. The hard bias material(s) and other layers are deposited while the conventional hard mask 56' is in place.

The conventional hard mask 56' is then removed, via step 20. Step 20 typically includes performing an ion mill to remove portions of the exposed hard bias materials on the sensor. A chemical mechanical planarization (CMP) is performed to remove the hard bias materials from the line frame.

The hard mask 56' may then be removed, for example via a reactive ion etch (RIE). An additional planarization is performed, via step 22. Fabrication of the conventional transducer hard bias structure is thus completed.

FIG. 4 depicts the conventional transducer 50 after step 22 is performed. Although the hard bias structure formation is complete, the conventional transducer 50 itself is not finished. Thus, the hard bias material(s) 64 are shown. In addition, the magnetoresistive sensor 54' and portions of the magnetoresistive stack 54L under the line frame are shown.

Although the conventional method 10 allows the conventional transducer 50 to be fabricated, there are several drawbacks. There may be significant variations in the track width of the conventional transducer 50. As can be seen in FIG. 4, the track width of the conventional magnetoresistive structure is w. This conventional track width may vary greatly. As a result, processing yield and performance may be adversely affected. The hard bias materials 64 may also contaminate the surface of the conventional magnetic transducer 50. Again, performance of the conventional magnetic transducer 50 may be adversely affected. Further, structures, such as test electrodes, covered by the hard bias material may not be exposed by the CMPs used to remove the hard bias materials 64 from the line frame 56L/58L/60L. Consequently, conventional transducers 50 fabricated together on a wafer may not be able to be tested on a wafer level.

Accordingly, what is needed is a system and method for improving the fabrication of a magnetic recording read transducer.

BRIEF SUMMARY OF THE INVENTION

A method and system for fabricating a magnetic transducer is described. The transducer has a device region, a field region, and a magnetoresistive stack. The method and system include providing a hard mask layer on the magnetoresistive stack and a wet-etchable layer on the hard mask layer. The method and system also include forming a mask including a hard mask formed from the hard mask layer and a wet-etchable mask formed from the wet-etchable layer. The hard mask includes a sensor portion and a line frame. The sensor portion covers a first portion of the magnetoresistive stack corresponding to a magnetoresistive structure. The line frame covers a second portion of the magnetoresistive stack in the device region. The wet-etchable mask includes a wet-etchable sensor portion on the sensor portion of the hard mask and a wet-etchable line frame on the line frame of the hard mask. The method and system also include defining the magnetoresistive structure in a track width direction after formation of the wet-etchable mask and the hard mask. At least one hard bias material is provided after the magnetoresistive structure is defined in the track width direction. A first portion of the at least one hard bias material is substantially adjacent to the magnetoresistive structure in the track width direction. The method and system also include removing the wet-etchable sensor portion and the wet-etchable line frame. Thus, a second portion of the at least one hard bias material residing on the wet-etchable sensor portion and on the wet-etchable line frame is removed.

DETAILED DESCRIPTION OF THE PREFERRED EMBODIMENTS

Figure 1:
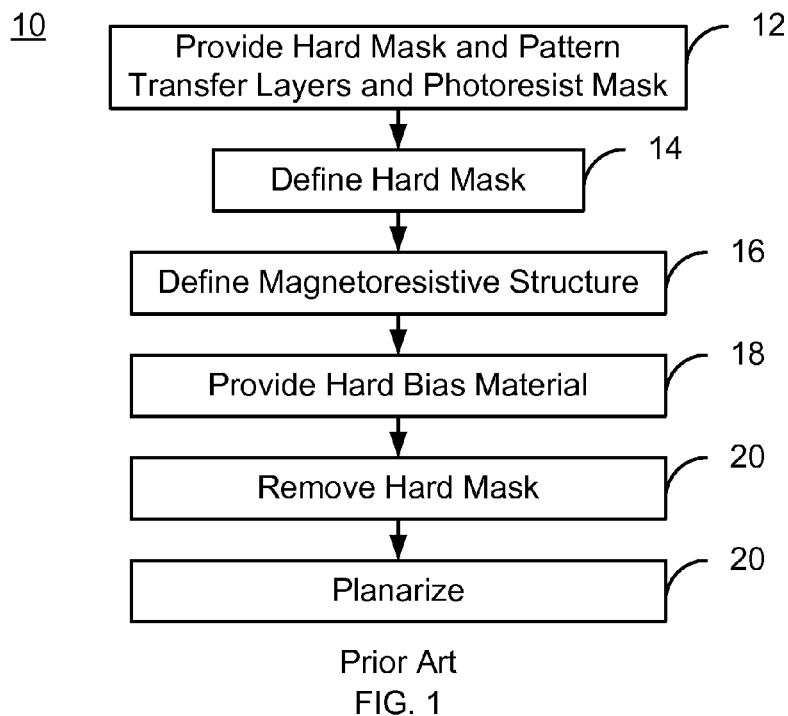
FIG. 1 is a flow chart depicting a conventional method for fabricating a magnetic recording transducer.
Figure 2:
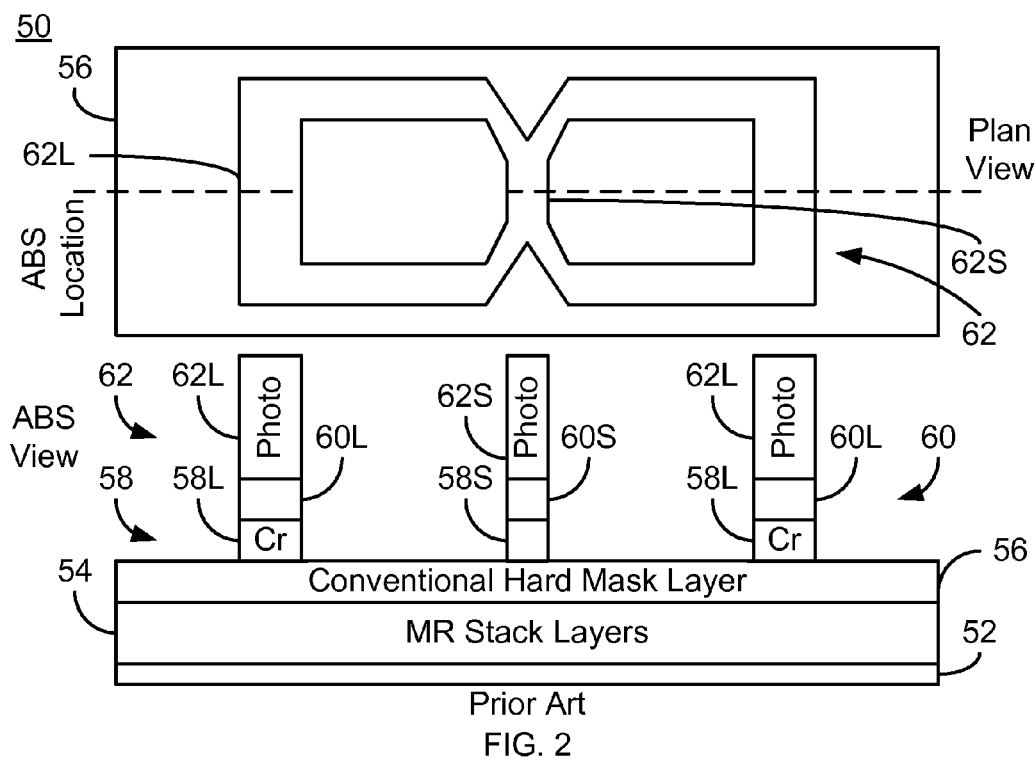
FIG. 2 depicts plan and ABS views of a conventional magnetic recording transducer during fabrication.
Figure 3:
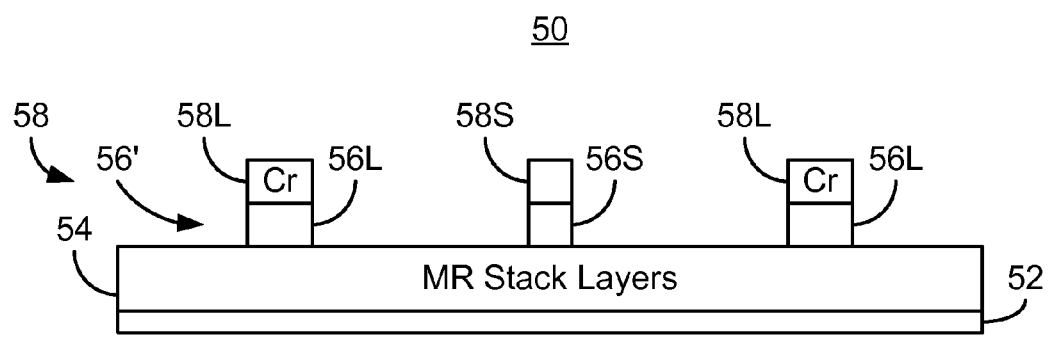
FIG. 3 depicts an ABS view of a conventional magnetic recording transducer during fabrication.
Figure 4:
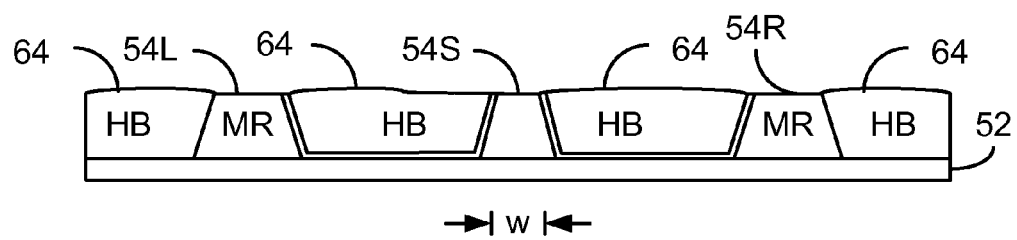
FIG. 4 depicts an ABS view of a conventional magnetic recording transducer during fabrication.
Figure 5:
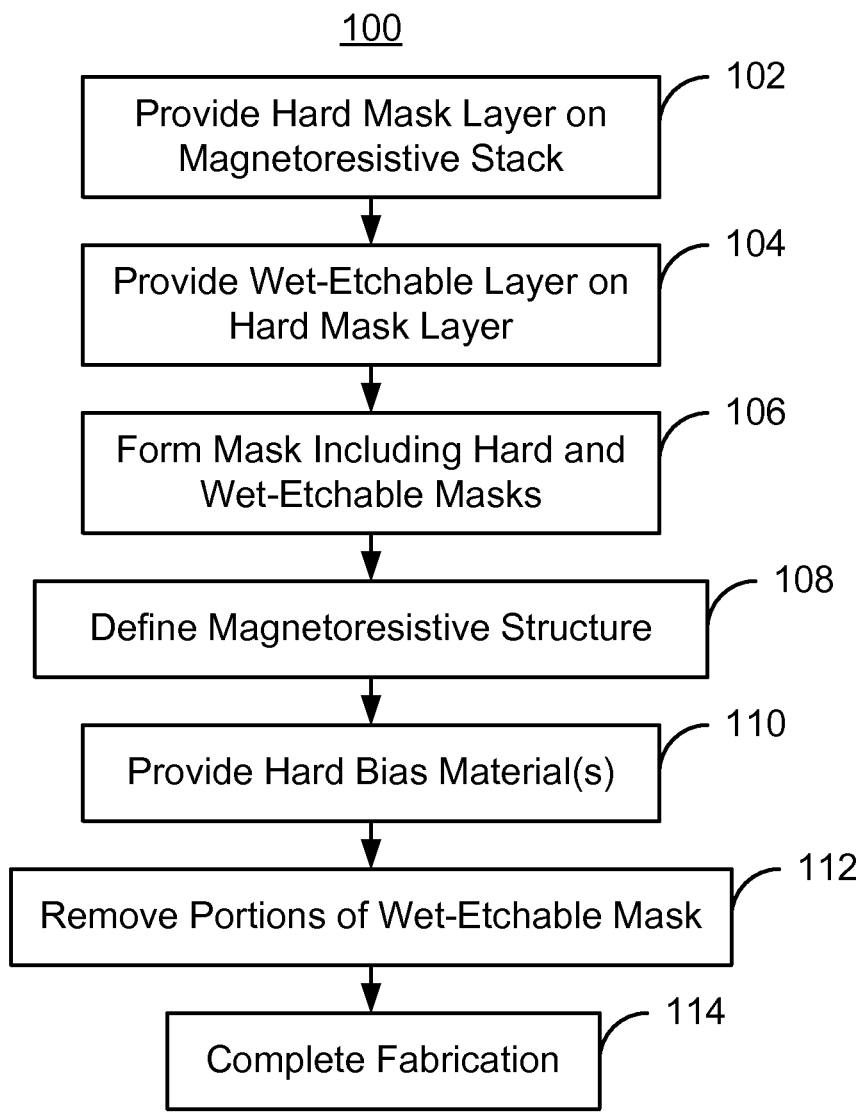
FIG. 5 is a flow chart depicting an exemplary embodiment of a method for fabricating a magnetic recording transducer.

FIG. 5 is an exemplary embodiment of a method 100 for providing magnetic recording transducer. For simplicity, some steps may be omitted. The method 100 is also described in the context of providing a single recording transducer. However, the method 100 may be used to fabricate multiple transducers at substantially the same time. The method 100 is also described in the context of particular layers. A particular layer may include multiple materials and/or multiple sub-layers. The method 100 also may start after formation of other portions of the magnetic recording transducer. For example, the method 100 commences after deposition of magnetoresistive layer(s) for a magnetoresistive stack. The magnetoresistive layers may include a pinning layer, a pinned layer, a nonmagnetic spacer layer, and a free layer. In addition, seed and/or capping layers may be used. The pinning layer may be an AFM or other layer configured to fix, or pin, the magnetization of the pinned layer. The pinned layer may be a synthetic antiferromagnetic (SAF) layer including magnetically coupled ferromagnetic layers separated by a nonmagnetic layer. The ferromagnetic layers may be termed pinned and reference sub-layers. The nonmagnetic spacer layer may be a conductive layer for a giant magnetoresistive structure, an insulator for a tunneling magnetoresistive structure, or may have another structure. The free layer is ferromagnetic and has a magnetization that is free to change in response to an external magnetic field, for example from a media. The free layer may have multiple sub-layers, as may the pinned and reference sub-layers. Further, the transducer may be considered to have a device region, in which the magnetoresistive structure is to be formed, and a field region distal from the magnetoresistive structure.

A hard mask layer is provided on the magnetoresistive stack, via step 102. Formation of the hard mask layer may include depositing at least one of SiC and diamond-like carbon (DLC). A wet-etchable mask layer is provided on the hard mask layer, via step 104. Step 104 may include depositing an aluminum oxide (e.g. $Al_2O_3$) layer. In some embodiments, the aluminum oxide is directly on the SiC/DLC hard mask layer. The wet-etchable layer may be thin. In some embodiments, the layer may be twenty to forty nanometers thick. in some such embodiments, the wet-etchable layer may be twenty-five through thirty-five nanometers thick. In other embodiments, the wet-etchable layer is not more than thirty nanometers thick. The wet-etchable layer is removable using a wet etch that leaves the hard mask layer substantially intact. Stated differently, the wet etch used to remove the wet-etchable layer has a high selectivity for the wet-etchable layer versus the hard mask layer.

A mask is formed using the hard mask and wet-etchable layers, via step 106. The mask provided in step 106 thus includes a hard mask and a wet-etchable mask. The hard mask is formed from the hard mask layer. The wet-etchable mask is formed from the wet-etchable layer. The hard mask includes a sensor portion and a line frame. The sensor portion covers part of the magnetoresistive stack corresponding to a magnetoresistive structure. Stated differently, the sensor portion of the hard mask covers the portion of the magnetoresistive stack from which the sensor is to be formed. Similarly, the wet-etchable mask includes a wet-etchable sensor portion on the sensor portion of the hard mask and a wet-etchable line frame on the line frame of the hard mask. Because the structure is being formed may be a read sensor, the portion(s) of the mask(s) covering the magnetoresistive structure are termed "sensor portion(s)". However, the method and system described herein may be used to form another magnetoresistive structure. The line frame portions of the mask(s) cover a second portion of the magnetoresistive stack in the device region. In some embodiments, the line frame may be significantly wider than the sensor portion. The line frame may be desired to be wider to serve as a support structure for later processing steps, such as a CMP. For example, the line frame may have a width on the order of at least two hundred nanometers, while the structure portion has a width on the order of sixty nanometers or less. In some embodiments, the width of the sensor portion may be thirty to forty nanometers or less. However, in other embodiments, these distances may vary. Further, the line frame may be a significant distance from the sensor portion. For example, at the air-bearing surface (ABS) location, the line frame may be at least three microns from the sensor portion. In some such embodiments, the line frame is eight to ten microns from the sensor portion. However, in other embodiments, these distances may vary.

Step 106 may include providing pattern transfer layers on the wet-etchable layer as well as a photoresist mask on the pattern transfer layers. In other embodiments, some or more of these layers may be omitted. In some embodiments, the pattern transfer layers include a Cr hard mask layer and an ARC layer. A photoresist mask having sensor and line frame portions is provided on the ARC layer. For example, a photoresist layer may be deposited on the ARC layer, and then patterned using photolithography. The pattern may be transferred to the pattern transfer layers, to the wet-etchable layer, and to the hard mask layer.

Figure 6:
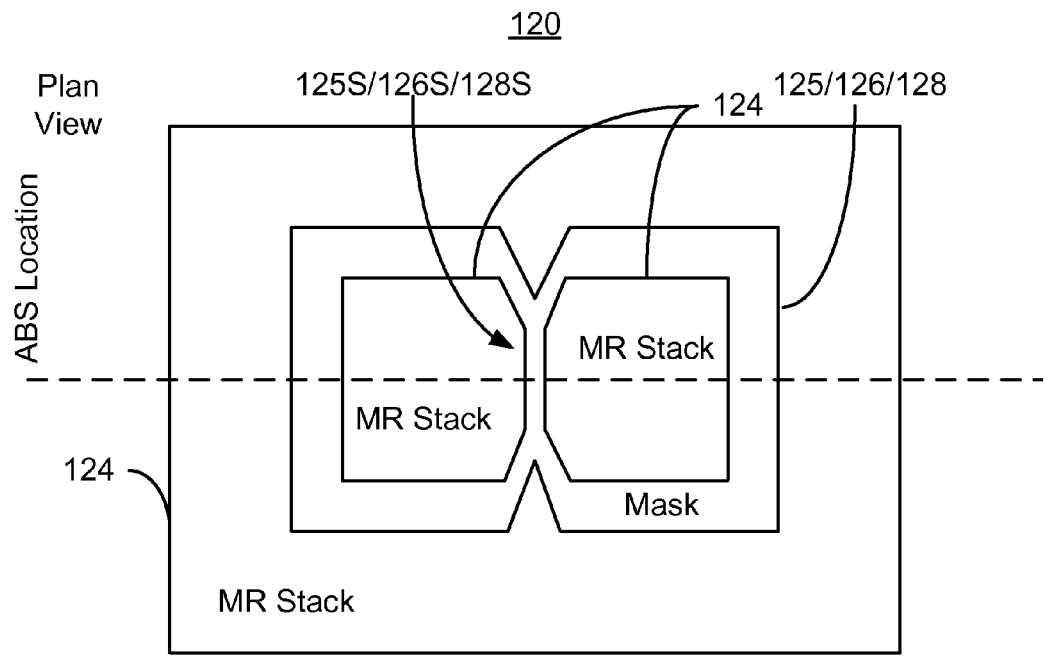
FIG. 6 depicts plan and ABS views of an exemplary embodiment of a magnetic recording transducer during fabrication.
Figure 6:
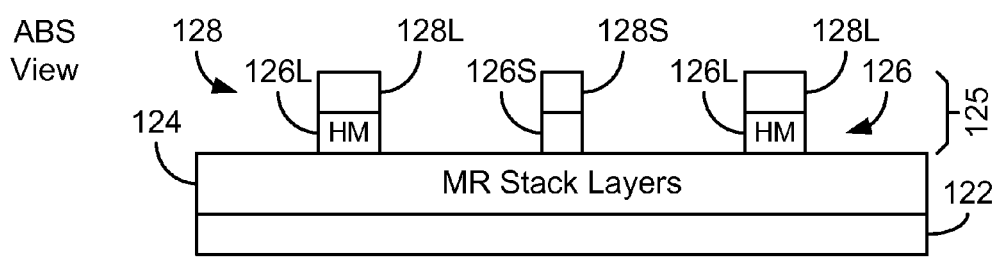

FIG. 6 depicts plan and ABS location views of the transducer 120. For clarity, FIG. 6 is not to scale. The ABS location is the position at which the ABS will be located once fabrication of the transducer 120 is completed. Thus, a substrate 122 and magnetoresistive stack layers 124 are shown. The magnetoresistive stack 124 may include an antiferromagnetic (AFM) layer, a pinned layer, a nonmagnetic spacer layer, and a free layer. Other layers, such as additional pinned and spacer layers may also be used. In addition, seed and/or capping layers may be provided. Also depicted is a mask 125 that is formed in step 106. The mask includes a hard mask 126 and a wet-etchable mask 128. The hard mask 126 includes a sensor portion 126S and line frame 126L. The wet-etchable mask 128 includes a sensor portion 128S and a line frame 128L. The pattern transfer, photoresist mask, and other layers that might be used in formation of the mask 125 are not shown.

The magnetoresistive structure is defined, via step 108. In some embodiments, the magnetoresistive structure is defined by using an ion mill while the mask 125 in place. The wet-etchable mask 128 is also a stop layer for the ion milling. Thus, to a large extent neither the wet-etchable mask 128 nor the hard mask 126 is consumed or otherwise shrunk in the ion milling process.

Hard bias material(s) are provided after the magnetoresistive structure is defined, via step 108. Hard bias material(s) include those materials having a sufficiently high coercivity that normal operation of the magnetoresistive structure does not alter the magnetization (and thus the bias) of the hard bias materials. A portion of the hard bias material(s) is substantially adjacent to the magnetoresistive structure in the track width direction. If the magnetoresistive structure is to be used in a current-perpendicular-to-plane (CPP) configuration, then step 108 may include deposition of an insulating layer prior to the hard bias materials. In addition, seed and/or capping layers may also be provided in step 108. The seed and/or capping layer(s) may each include sub-layers. For example, the capping layer may be a bilayer including a Ta sub-layer and a Ru sub-layer on the Ta sub-layer. In another embodiment, the capping layer(s) may be a trilayer including a Ru sub-layer sandwiched by two Ta sub-layers.

Portions of the wet-etchable mask 128 may then be removed, via step 112. More specifically, the sensor portion 128S and line frame 128L of the wet-etchable mask 128 are removed. As a result, materials on the wet-etchable sensor portion 128S and line frame 128L are also removed. Step 112 may include performing a high angle ion mill to open aperture(s) on the sidewalls of the hard bias material(s) residing on the wet-etchable mask. Thus, a portion of the underlying wet-etchable mask 128 is exposed. A wet etch and lift-off may then be performed. In some embodiments, a lift-off and wet etch are performed together. In other embodiments, the wet etch and lift-off may be performed separately. Because the high-angle ion mill exposes the wet-etchable mask, an etchant may be able to physically contact the wet-etchable mask. The etchant removes the wet-etchable material(s) used in the wet-etchable mask 128. The relevant portions of the wet-etchable mask 128 may be lifted off substantially simultaneously or as a separate step. In some embodiments, the etching solution may include one or more of photoresist developer, sodium hydroxide plus Ethylenediaminetetraacetic acid (EDTA), and potassium hydroxide.

In other embodiments, additional processes may be added to the wet etch and lift-off. In some embodiments, a thin layer of an additional wet-etchable material may be blanket deposited. For example, a layer of aluminum oxide having a thickness of ten through twenty nanometers may be grown. A gentle planarization may then be performed on the transducer 120. For example, a CMP using a pressure of not more than one through two psi might be performed. The planarization aids in removing portions of the hard bias materials on the masks 126/128. Wet etch(es) and lift-off(s) that remove the wet-etchable mask 128 and the thin wet-etchable layer may be performed. As discussed above, the wet etch(es) and lift-off(s) may be performed as a single step or as separate steps. The wet-etchable mask 128 and any remaining hard bias materials on the wet-etchable mask 128 are removed. Hard bias material on the field and other regions of the transducer 120, for example due to the CMP, are also removed when the thin wet-etchable layer is removed.

Although portions of the wet-etchable mask 128 are removed, the hard mask 126 is substantially insensitive to the etchant used in step 112. The sensor portion 128S and line frame 128L of the wet-etchable mask 128 may be removed without removing the hard mask 126. The sensor portion 128S and line frame 128L of the wet-etchable mask 128 may thus be removed without removing the hard mask 126. However, the portion of the hard bias material remaining on the wet-etchable mask 128 are removed in step 112.

Fabrication of the transducer 100 may then be completed, via step 114. Step 114 generally includes removal of the hard mask 126. This may be accomplished by a CMP and/or a reactive ion etch (RIE) appropriate for the material(s) used in the hard mask 126.

Figure 7:
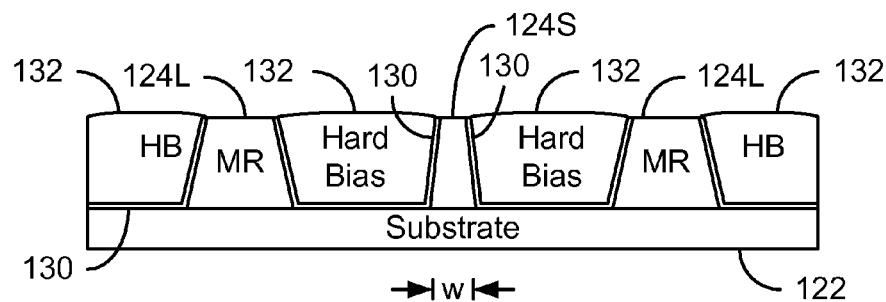
FIG. 7 depicts an ABS view of an exemplary embodiment of a magnetic recording transducer.

FIG. 7 depicts the transducer 120 after at least part of step 114 is performed. For clarity, FIG. 7 is not to scale. Thus, a magnetoresistive structure 124S is shown. Also shown are other portions 124L of the magnetoresistive stack 124 remaining after fabrication is complete. The hard bias 132 and insulating layer 130 are also depicted. In other embodiments, the insulating layer 130 might be omitted. The magnetoresistive sensor 124S has a track width, w. The track width corresponds to a characteristic distance between the right and left sides. In some embodiments, the magnetoresistive sensor 130 has a track width of not more than one hundred nanometers. In some embodiments, the track width may be smaller. For example, in one embodiment, the track width, w, is not more than sixty nanometers. In other embodiments, w is not more than thirty to forty nanometers. Subsequent processing, such as formation of insulating layers, leads, and/or other structures may, then be completed.

Using the method 100, the transducer 120 having a magnetoresistive read sensor 124S may be formed. As discussed above with respect to FIGS. 1-4, the conventional transducer 50 may have significant variations in track width. It is believed that these variations are due to shrinkage of the SiC hard mask 56 during the step of defining the magnetoresistive structure. In contrast, the SiC mask 126 undergoes less shrinkage during the ion mill that defines the magnetoresistive structure 124S. More specifically, the wet-etchable mask 128 may reduce or eliminate shrinkage of the underlying hard mask 126 while the magnetoresistive structure 124S is defined. Thus, the width of the junction 124S may be better controlled. As a result, variations in the track width may be reduced. Consequently, manufacturing yield and performance may be improved.

Fabrication of the hard bias structures 132 may be improved. Portions of the hard bias (not shown) residing on the wet-etchable mask 126 are removed during removal of the wet-etchable mask 126. This is in contrast to the conventional method 10, which removes the hard bias on the line frame 56L/58L/60L using a CMP. More specifically, a gentler CMP is used in the conventional method 10 to remove the hard bias materials from the line frame. A gentle CMP helps ensure that the conventional hard bias structures 64 are not Co depleted. It has been determined that removal of the hard bias materials from the line frame 56L/58L using such a CMP in step 20 may spread the hard bias materials across the surface of the conventional transducer 50. This contamination may be difficult to remove. In contrast, hard bias materials on the line frame 128L of the wet-etchable mask are removed in step 112. As a result, any subsequent planarization steps may be less likely to leave contamination from the hard bias. Consequently, issues due to hard bias contamination may be mitigated or eliminated.

Test electrodes and other structures may also have superior functionality using the method 100. As discussed above, portions of the hard bias material on the line frame 56L/58L/60L may be removed through step 112, which removes the wet-etchable mask. This wet-etch/lift-off process may also be used to remove the hard bias from other structures, such as test electrodes. Consequently, the hard bias on structures such as test electrodes may be removed more effectively and without regard to differences between the size of the line frame 126L/128L and the size of the other structures. Thus, manufacturing yield and the ability to test the transducer 120 may be improved. Performance of the transducer 120 and manufacturing yield using the method 100 may be enhanced.

Figure 8:
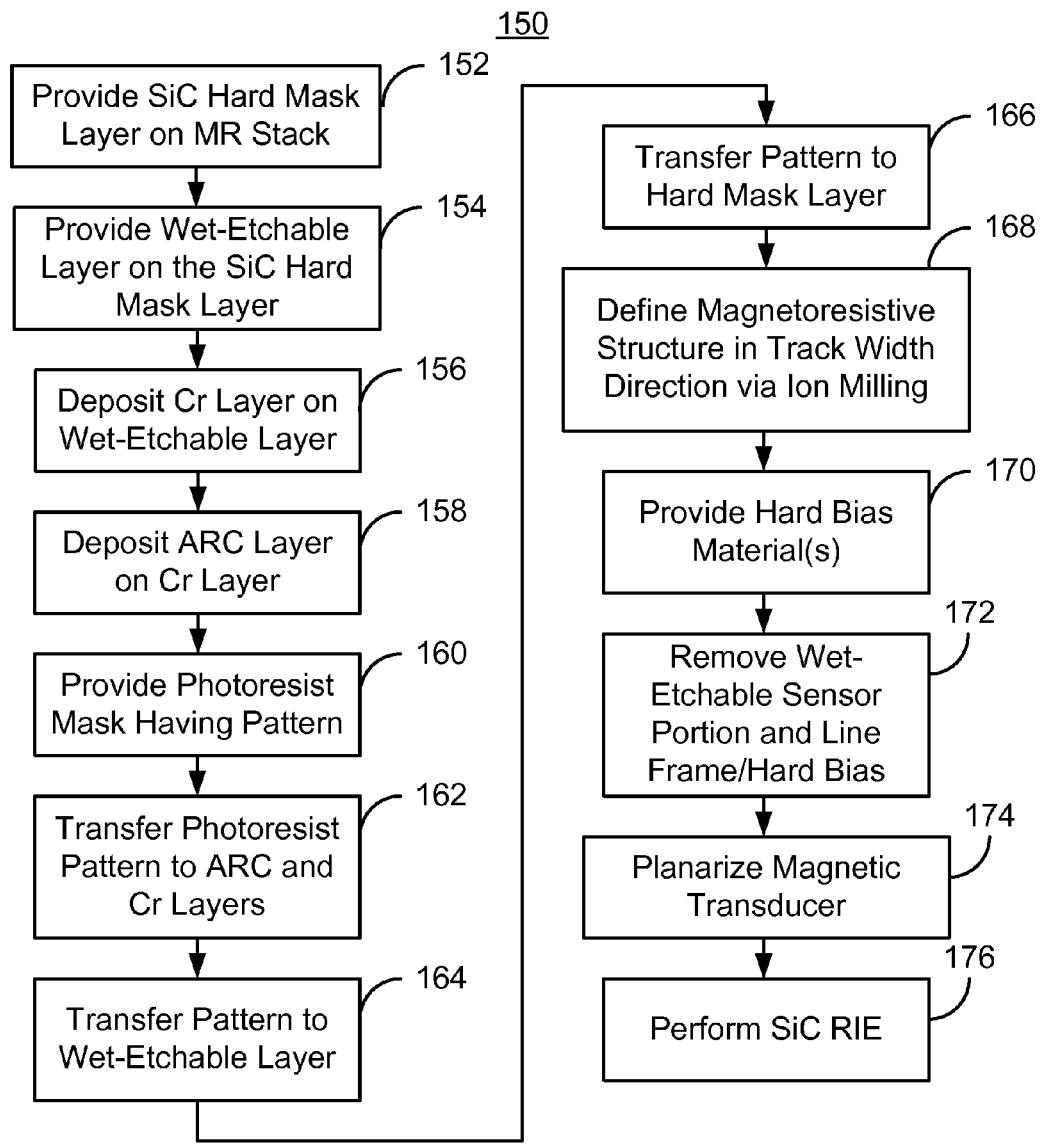
FIG. 8 is a flow chart depicting another exemplary embodiment of a method for fabricating a magnetic recording transducer.

FIG. 8 is a flow chart depicting another exemplary embodiment of a method 150 for fabricating a magnetic recording transducer. FIGS. 9-20 depict plan and ABS views of another exemplary embodiment of a magnetic recording transducer 200 during fabrication. For clarity, FIGS. 9-20 are not to scale. The method 150 is described in the context of the transducer 200. For simplicity, some steps of the method 150 may be omitted. The method 150 is also described in the context of providing a single recording transducer 200. However, the method 150 may be used to fabricate multiple transducers at substantially the same time. The method 150 and transducer 200 are also described in the context of particular layers. A particular layer may include multiple materials and/or multiple sub-layers. The method 150 also may start after formation of other portions of the magnetic recording transducer 200. The method 150 commences after formation of a magnetoresistive stack. The magnetoresistive layers may include a pinning layer, a pinned layer, a nonmagnetic spacer layer, and a free layer. In addition, seed and/or capping layers may be used. Examples of such layers are described above. Further, the transducer may be considered to have a device region, in which the magnetoresistive structure is to be formed, and a field region distal from the magnetoresistive structure.

A hard mask layer is provided on the magnetoresistive stack, via step 152. Step 152 includes blanket depositing a hard mask layer such as SiC, amorphous carbon (e.g. sputtered carbon), and/or DLC on the magnetoresistive stack. For the purposes of describing the method 150, it is assumed that an SiC layer is used. In some embodiments, the step 154 includes depositing a hard mask layer having a thickness of not more than seventy nanometers. In another embodiment, the hard mask layer provided in step 154 has a thickness of not more than sixty nanometers. However, in other embodiments, other thicknesses of the hard mask layer may be used.

A wet-etchable layer is provided on the SiC hard mask layer, via step 154. In some embodiments, the wet-etchable layer is a thin aluminum oxide layer. In some embodiments, the aluminum oxide layer is not more than forty nanometers thick. In some such embodiments, the aluminum oxide layer is at least twenty nanometers thick. In some embodiments, the aluminum oxide layer is twenty-five through thirty-five nanometers thick. In other embodiments, the aluminum oxide layer may be not more than thirty nanometers thick. In some embodiments, the hard mask layer is a stop layer for an RIE of the wet-etchable layer. For example, SiC may be a stop layer for an aluminum oxide RIE.

A second hard mask layer, such as Cr, is deposited on the wet-etchable layer, via step 156. In some embodiments, the second hard mask layer is a stop layer for processes which remove the wet-etchable layer and the hard mask layer. For example, Cr is a stop layer for both aluminum oxide and SiC RIE chemistries. An ARC layer may then be provided on the Cr layer, via step 158. The ARC layer is configured to assist in photolithography by reducing reflections from the underlying layer(s).

A photoresist mask is provided, via step 160. The photoresist mask has a pattern that is desired to be transferred to the underling layers. Step 160 includes spinning on or otherwise covering at least the relevant areas of the transducer 200 with a layer of photoresist. Photolithography may then be used to form the desired pattern in the photoresist layer. The photoresist mask covers regions corresponding to the sensor portion and line frame.

Figure 9:
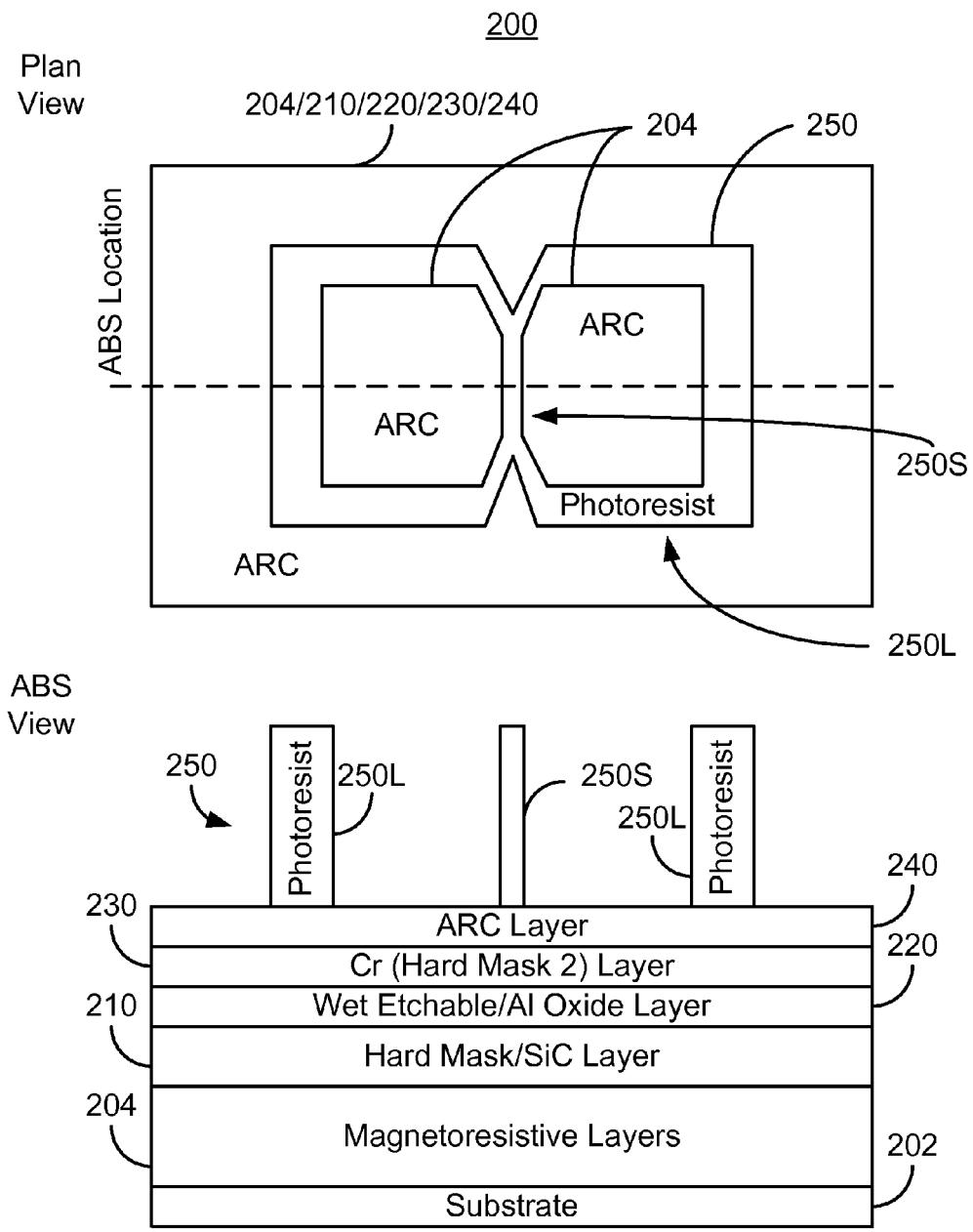
FIGS. 9-19 depict plan and ABS view of another exemplary embodiment of a magnetic recording transducer during fabrication.

FIG. 9 depicts plan and ABS views of the transducer 200 after step 160 is performed. Thus, a substrate 202 and magnetoresistive stack 204 are shown. In addition, the hard mask layer 210, wet-etchable layer 220, Cr layer 230, and ARC layer 240 are shown as being blanket deposited on the magnetoresistive stack 204. Further, the photoresist mask 250 is also shown. The photoresist mask 250 has portions 250S and 250L corresponding to the magnetoresistive structure and the line frame, respectively. The portion 250S corresponding to the magnetoresistive sensor may be printed with a critical dimension at the limit of the photo process used for the photoresist mask 250. However, the width of the line frame 250L may be larger, for example on the order of two hundred nanometers or more. In other embodiments, the width of the line frame 250L may be less, for example, from one hundred through two hundred nanometers. However, the line frame 250L is typically significantly wider than the sensor portion 250S. For example, the sensor portion 250S may be on the order of sixty nanometers or less. Portions of the line frame 250L may also be distant from the sensor portion 250S. For example, the edges of the line frame 250L may be eight to ten microns from the sensor portion 250S of the photoresist mask 250.

Figure 10:
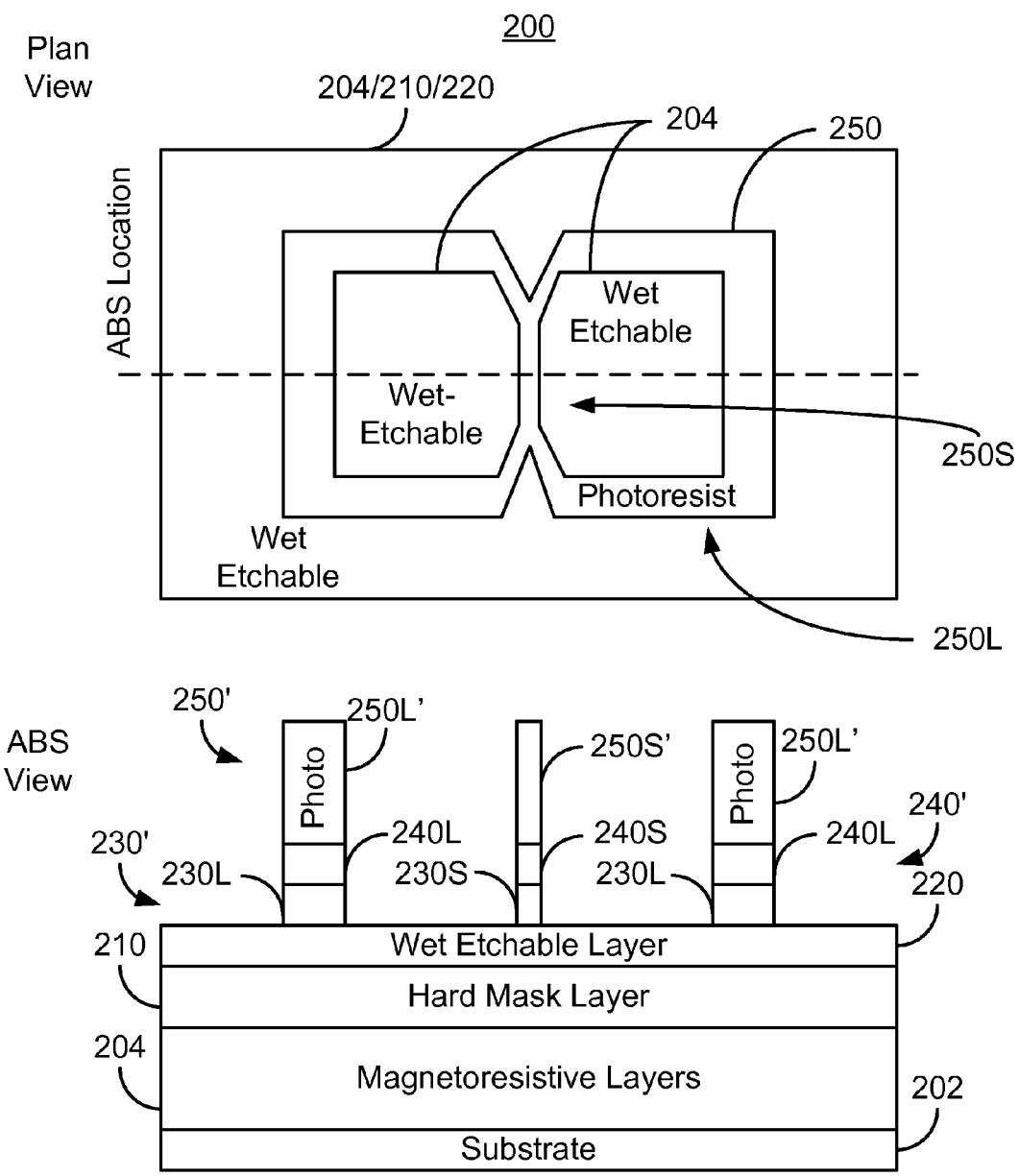

The pattern of the photoresist mask is transferred to the ARC layer 240 and the Cr layer 230, via step 162. In some embodiments, step 162 may include performing RIE(s) appropriate for the material(s) used for the ARC layer 240 and the Cr layer 230. In addition, the remaining photoresist 250 is stripped. FIG. 10 depicts the transducer 200 after the pattern has been transferred, but before the photoresist mask 250' has been stripped. Thus, the pattern of the photoresist mask 250' has been transferred to the ARC layer 240' and the Cr layer 230'. Thus, the ARC layer 240' includes sensor portion 240S and line frame 240L corresponding to the sensor portion 250S' and the line frame 250S', respectively. Similarly, the Cr layer 230' includes sensor portion 230S and line frame 230L corresponding to the sensor portion 250S' and the line frame 250S', respectively.

Figure 11:
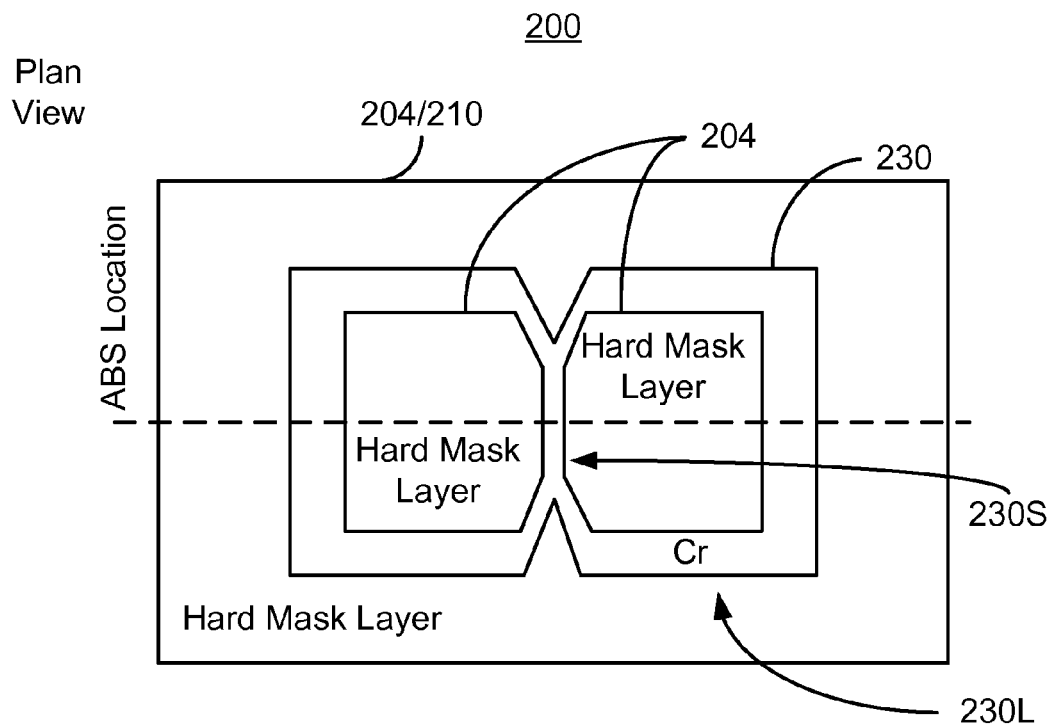
Figure 11:
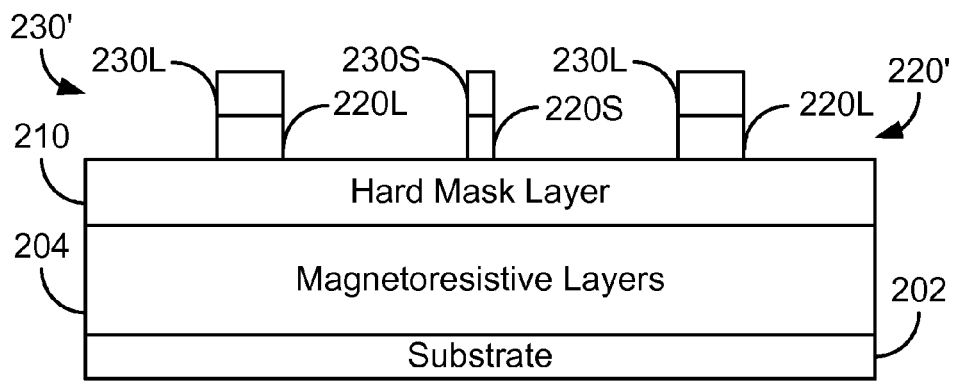

The pattern from the photoresist mask 250' is then transferred to the wet-etchable layer 220, via step 164. Step 164 may include performing an aluminum oxide RIE. FIG. 11 depicts the transducer 200 after step 164 is performed. The photoresist mask 250 and ARC layer 230' have been removed. The pattern has been transferred to the wet-etchable layer, forming wet-etchable mask 220'. The wet-etchable mask 220' includes sensor portion 220S and line frame 220L. In the embodiment shown, the hard mask layer 210 is a stop for the removal process, such as an aluminum oxide RIE, used in step 164. Thus, the hard mask 210 remains substantially intact after step 164 is performed. The Cr layer 230' is also a stop layer for the removal process used in step 164. Thus, the pattern of the photoresist mask 250 and Cr mask 230' may be transferred, forming wet-etchable mask 220'.

Figure 12:
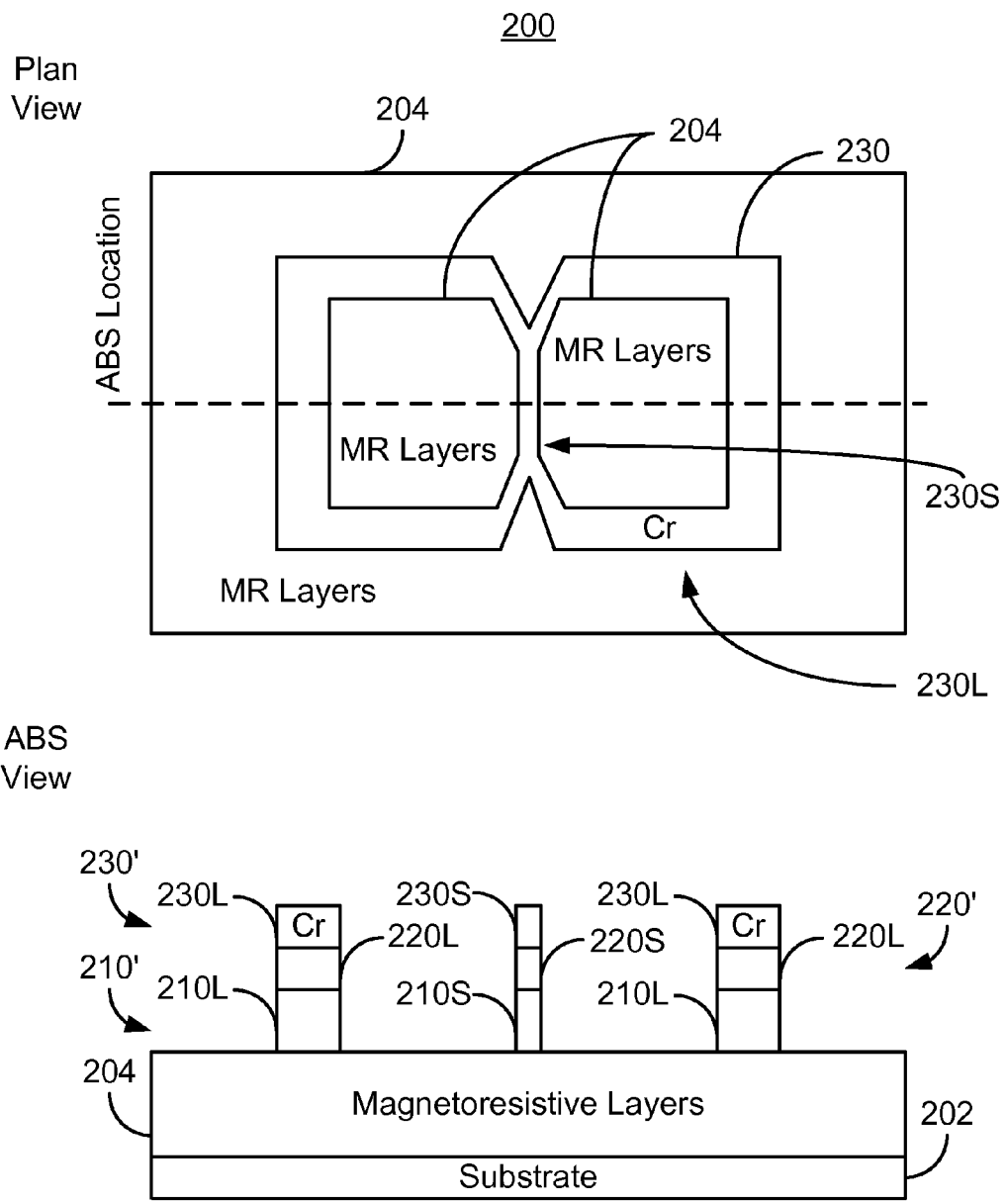

The pattern originally from the photoresist mask 250 is then transferred to the hard mask layer 210, via step 166. Step 166 may include performing an SiC RIE. FIG. 12 depicts the transducer 200 after step 166 is performed. The pattern has been transferred to the hard mask layer, forming had mask 210'. The hard mask 210' includes sensor portion 210S and line frame 210L. In the embodiment shown, the Cr layer 230' is also a stop layer for the removal process used in step 166. The desired pattern from the photoresist mask 250 has, therefore, been transferred to the hard mask 210'.

Figure 13:
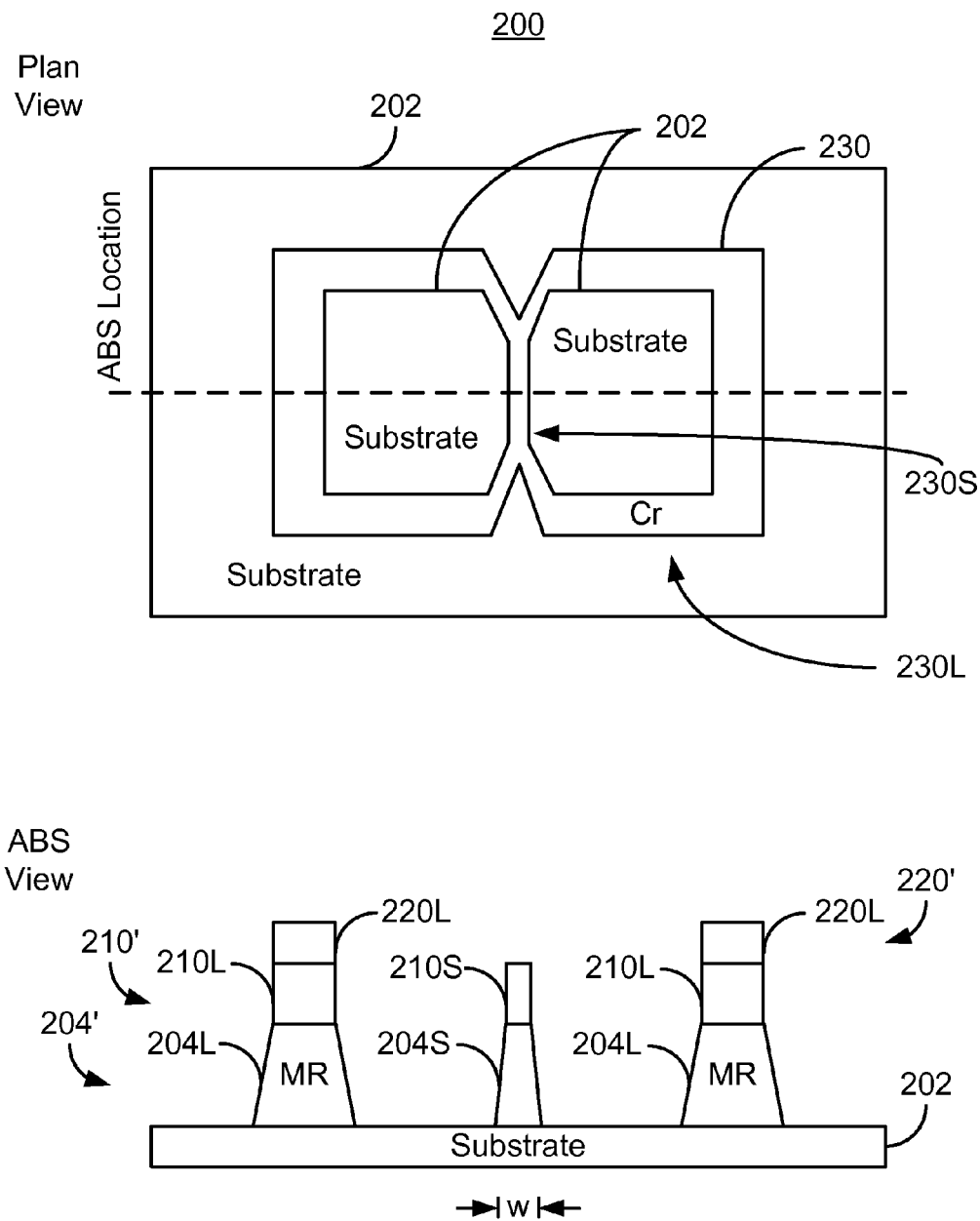

The magnetoresistive structure is defined in the track width direction, via step 168. In step 168, the hard mask 210' is used to protect portions of the magnetoresistive stack 204 from the process. In one embodiment, defining the magnetoresistive structure in a track width direction includes performing an ion mill. The wet-etchable mask 220' also protects the hard mask 210' from shrinkage during ion milling. FIG. 13 depicts the transducer 200 after step 168 is performed. Thus, a magnetoresistive structure 204S has been defined. In one embodiment, the structure, magnetoresistive layers 204L corresponding to the line frame of the hard mask have been defined from the magnetoresistive stack 204. In addition, magnetoresistive layers 204' in the field region have also been defined. The sensor 210 has a track width of not more than one hundred nanometers. In other embodiments, the track width may be smaller. For example, in one embodiment, the track width, w, is not more than sixty nanometers. In other embodiments, w is not more than thirty to forty nanometers. However, other embodiments may have other track widths, including less than thirty nanometers. In contrast, the width of portions 204L may be larger as these portions correspond to the line frame. In some embodiments, the portions 204L may be two hundred nanometers or more in width.

At least one hard bias material is provided, via step 170. Also in step 170 an insulating layer may be provided before the hard bias material(s). An insulator is optionally provided if the magnetoresistive structure is to be used in a CPP configuration. A first portion of the hard bias material(s) is substantially adjacent to the magnetoresistive structure in the track width direction. In some embodiments, capping layer(s) for the hard bias material(s) is also provided in step 170.

Figure 14:
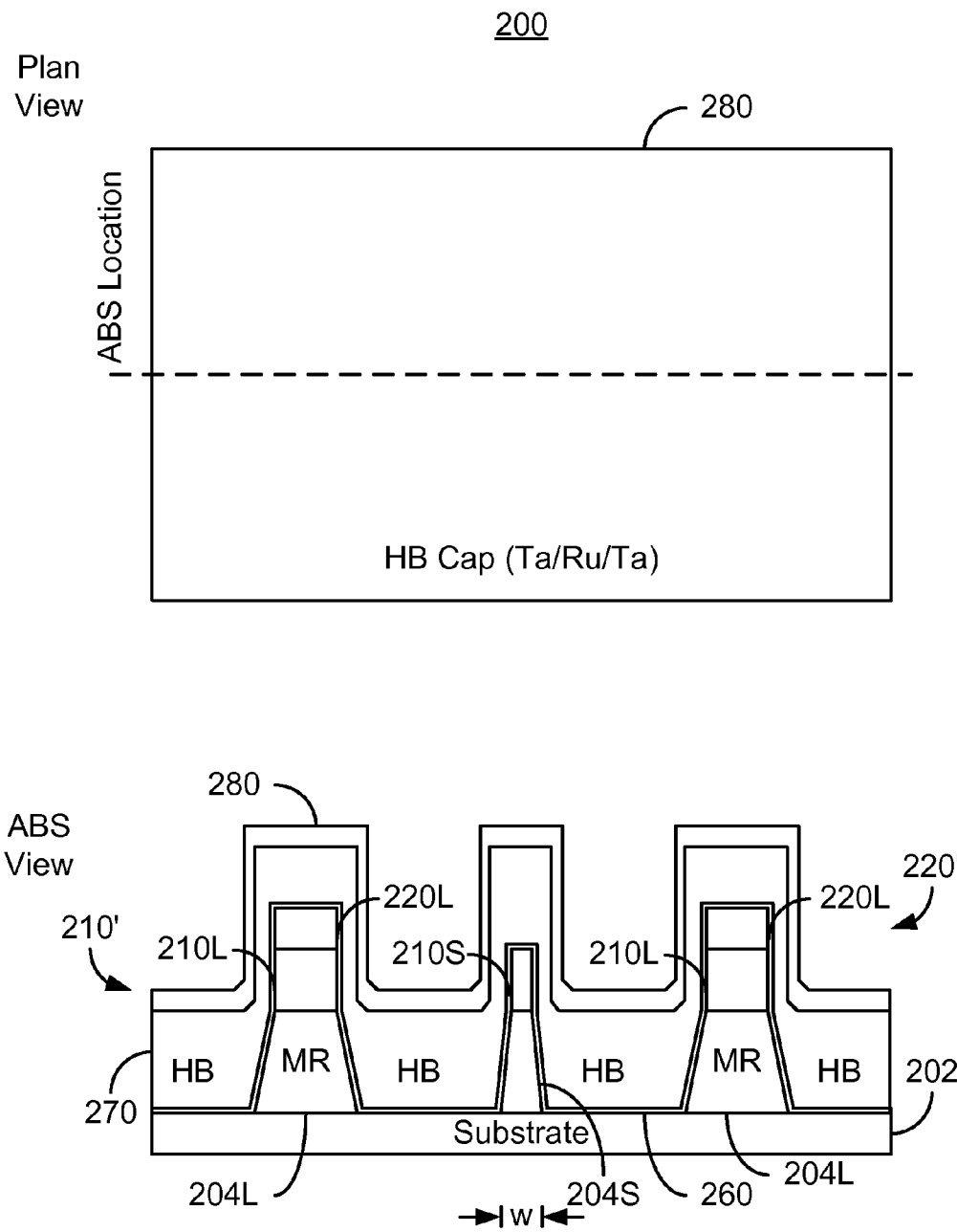

Such a capping layer may have sub-layer(s). For example, the capping layer may be a bilayer of Ta and Ru. In another embodiment, the capping layer may be a trilayer including a first Ta sub-layer, a Ru sub-layer, and a second Ta sub-layer. In such an embodiment, the Ru sub-layer resides between the Ta sub-layers. FIG. 14 depicts the transducer 200 after step 170 is performed. Thus, optional insulating layer 260, hard bias layer 270 and capping layer(s) 280 are shown.

Figure 15:
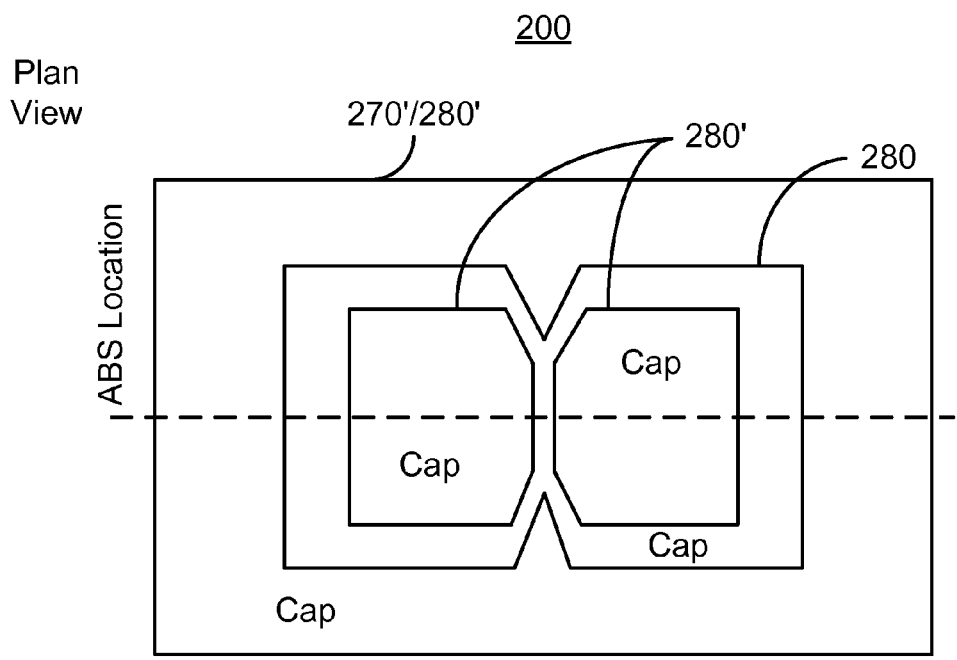
Figure 15:
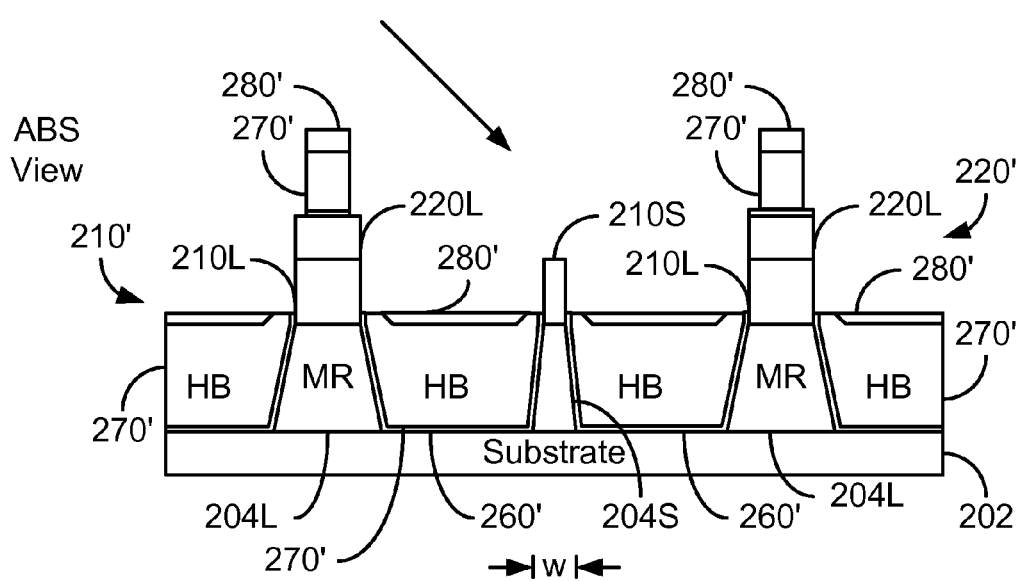

The wet-etchable mask and corresponding hard bias materials 270 are removed, via step 172. Step 172 generally includes multiple substeps. A portion of the hard bias material(s) 270 and other layers 260 and 280 are removed from at least the sidewalls of parts of the wet-etchable mask 220'. This process may include performing a high angle ion mill, for example at an angle of sixty or more degrees from normal to the surface of the transducer 200. FIG. 15 depicts the transducer 200 during step 172, as the high angle ion mill is performed. The portions of the insulating layer 260', hard bias material(s) 270' and capping layer(s) 280' on the wet-etchable mask 220' are removed. As a result, the wet-etchable mask 220' is exposed. Note that not all of the materials 260', 270', and 280' need to be removed from the wet-etchable mask 220'. Instead, the wet-etchable mask 220' need only be exposed such that a wet etchant may come into contact with each portion of the wet-etchable mask 220' desired to be removed.

Figure 16:
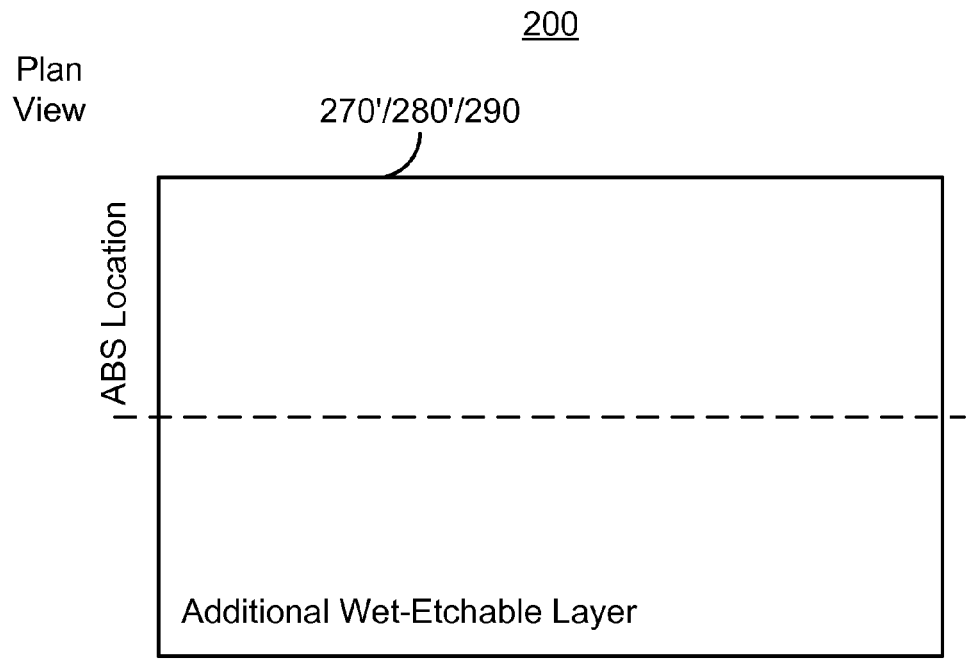
Figure 16:
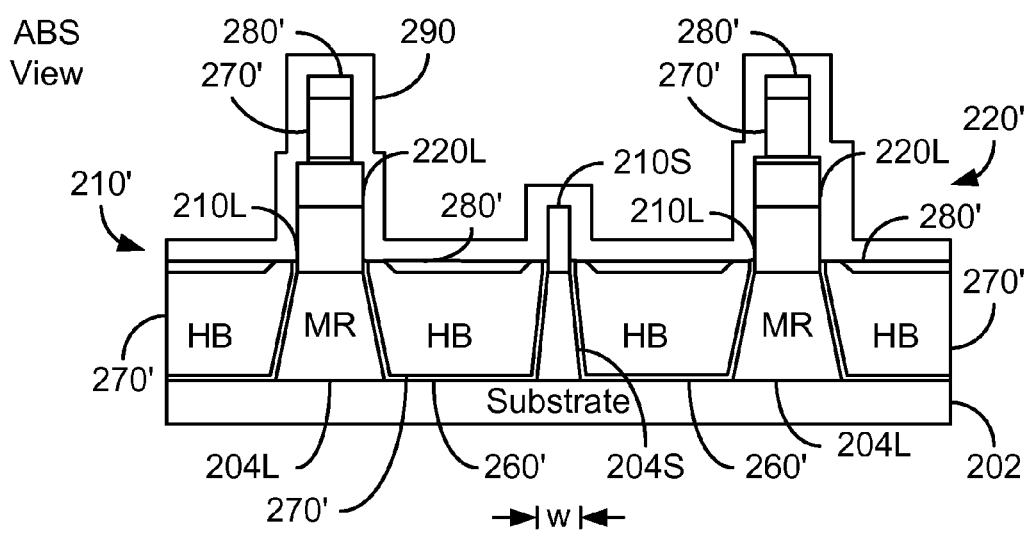
Figure 17:
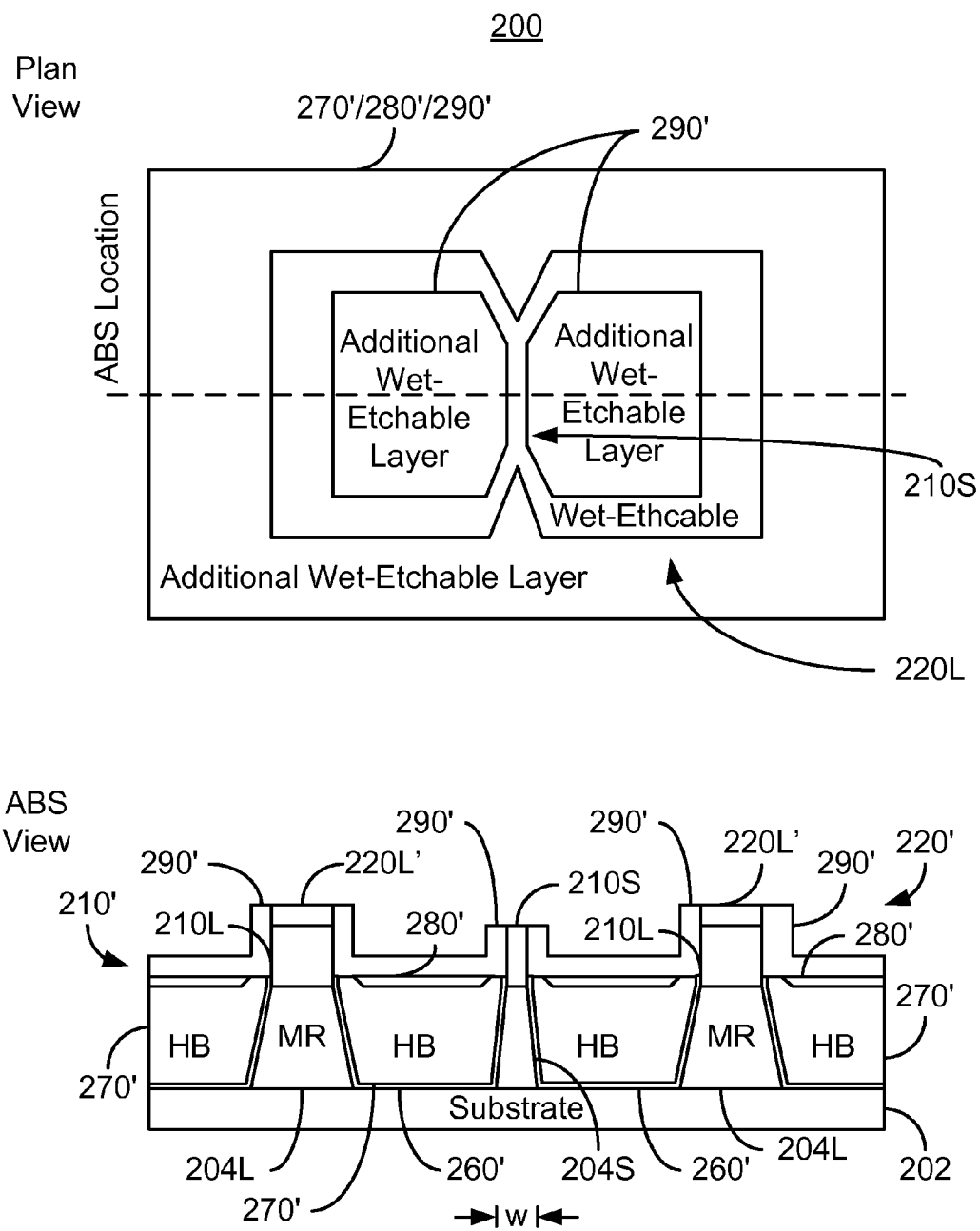

Step 172 may be continued in a variety of ways. In some embodiments, another wet-etchable layer is deposited. For example, 10-20 nanometers of aluminum oxide may be deposited. FIG. 16 depicts the transducer 200 after deposition of such a layer 290. A gentle CMP may then be performed. The CMP may be performed at a loser pressure, for example not greater than one or two psi. Soft pads may be used. In some embodiments, the slurry utilized is water. Thus, portions of the hard bias 270' may be removed. FIG. 17 depicts the transducer 200 after such a planarization has been performed. In the embodiment shown, the hard bias 270' on the line portion 220L has been removed. Thus, the wet etchable mask 220' has been exposed. However, in other embodiment, the wet-etchable mask 220' may not be exposed.

Figure 18:
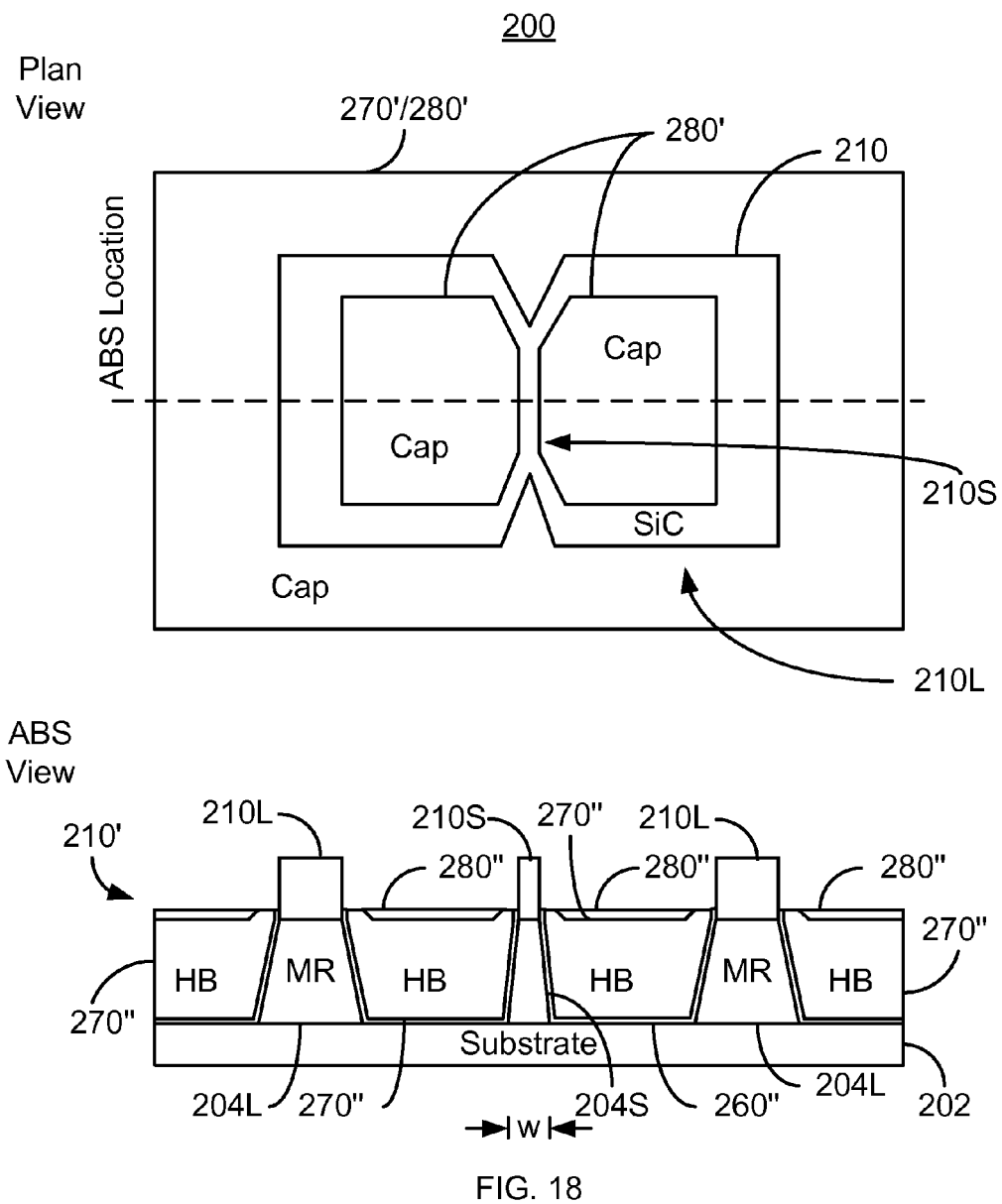

Either after the CMP or directly after the ion milling, a wet etch is employed as part of step 172. In some embodiments, a lift-off process is performed together with the wet etch. In other embodiments, the lift-off may be performed in a separate step after the wet etch is completed. This portion of step 172 includes exposing the wet-etchable mask 220' to a wet etchant that can remove the wet-etchable mask 220', but to which the hard mask 210' is insensitive. Such a wet etchant may include at least one of photoresist developer, sodium hydroxide plus EDTA, and potassium hydroxide. The sodium hydroxide may be used to adjust the pH of the wet etchant. In some embodiments, a pH of 11-14 is desired. FIG. 18 depicts the transducer 200 after step 172 is completed. Thus, the wet-etchable mask 220' (not shown in FIG. 18) has been removed. In embodiments in which the additional wet-etchable layer 290 is used, this layer is also removed. In addition, portions of the hard bias material(s) 270' and insulating layer 260' have been removed. Further, any hard bias that is spread to portions of the transducer 200 due to the CMP performed in step 172 is removed because the additional wet-etchable layer 290' is removed. Only hard bias 270", insulator 260", and capping layers 280" remain. Thus, the hard mask 210' is exposed.

A planarization, such as a CMP, may optionally be performed to remove any remaining hard bias materials, via step 174. The CMP may be carried out using a softer pad, a dilute slurry and/or a lower pressure. For example, the CMP may use a pressure of not more than two psi and water as a slurry. In other embodiments, a pressure of not more than one psi is used. Thus, the CMP performed in step 174 is analogous to the CMP performed in some embodiments of step 172.

Figure 19:
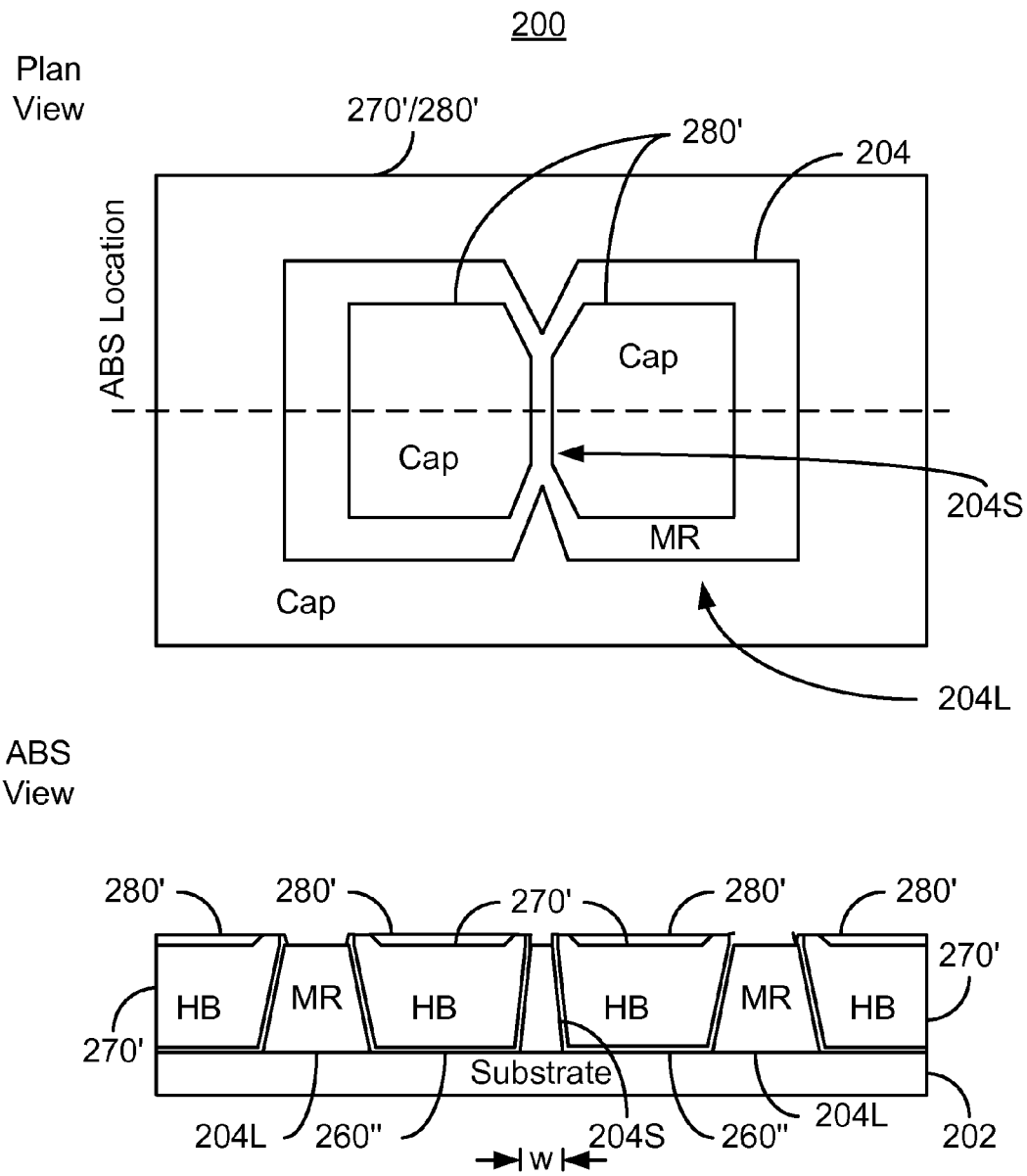
Figure 20:
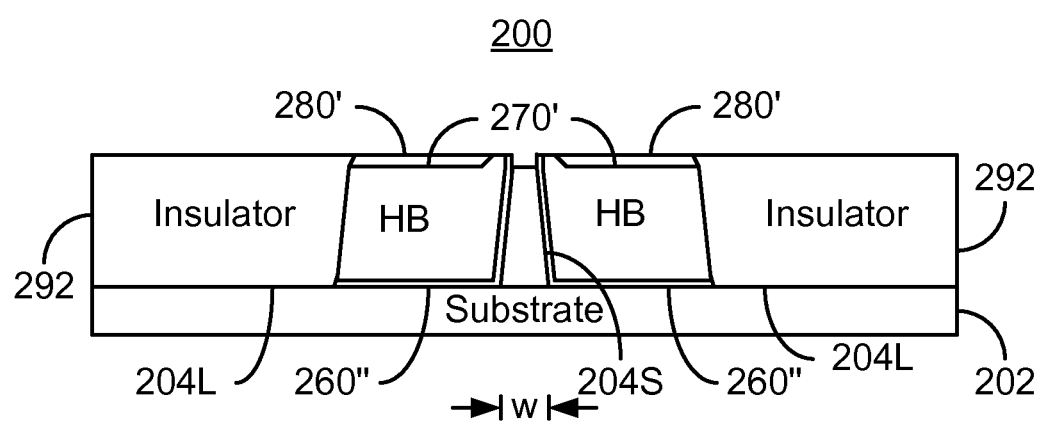
FIG. 20 depicts an ABS view of an exemplary embodiment of a magnetic recording transducer during fabrication.

The hard mask is removed, via step 176. In one embodiment, step 176 includes performing an SiC RIE to remove the hard mask 206". FIG. 19 depicts the transducer 200 after step 176 is performed. Thus, the magnetoresistive structure 204S has been exposed. Fabrication of the transducer 200 may then be completed. For example, FIG. 20 depicts an ABS view of one embodiment of a transducer 200 in which the magnetoresistive junction 19 after the magnetoresistive sensor 204S is completed and has been insulated using insulators 292.

Using the method 150, the transducer 200 may be formed. Because the hard mask 210' is used in defining the magnetoresistive structure, better process margins may be achieved than is photoresist were used. The photoresist mask 250 is removed before the magnetoresistive structure 204S is defined. As a result, there may be less shadowing of the ion mill used, allowing for a more symmetric magnetoresistive structure 204S. Use of the wet-etchable mask 220'allows for reduction in the shrinkage of the underlying hard mask layer 220' during the ion mill that defines the magnetoresistive structure 204S. A lower variation in track width may thus be achieved. Because the hard bias 270 resides on the wet-etchable mask 220' and/or wet-etchable layer 290' (if present), much or all of the unwanted hard bias 270 may be removed by the wet etch of step 172. Contamination may thus be mitigated. Further, as the wet etch may not depend upon the size of the structure from which the hard bias is to be removed. Thus, structures, such as electrodes, may function better. Consequently, manufacturing yield and performance may be improved. These improvements may be achieved in higher density memories, for example 800 GB/in2 or beyond.

We claim:

1. A method for fabricating a magnetic transducer having a device region, a field region, and a magnetoresistive stack, the method comprising:
providing a hard mask layer on the magnetoresistive stack;
providing a wet-etchable layer on the hard mask layer, the wet etchable layer being an aluminum oxide layer;
providing an additional hard mask layer on the wet-etchable layer;
providing an antireflective coating (ARC) layer on the additional hard mask layer;
forming a mask including a hard mask formed from the hard mask layer and a wet-etchable mask formed from the wet-etchable layer, the hard mask including a sensor portion and a line frame, the sensor portion covering a first portion of the magnetoresistive stack corresponding to a magnetoresistive structure and the line frame covering a second portion of the magnetoresistive stack in the device region, the wet-etchable mask including a wet-etchable sensor portion on the sensor portion of the hard mask and a wet-etchable line frame on the line frame of the hard mask, the step of forming the mask including forming an additional hard mask from the additional hard mask layer such that the additional hard mask forms a pattern including the wet-etchable sensor portion and the wet-etchable line frame and patterning the wet-etchable layer using the pattern from the additional hard mask;
defining the magnetoresistive structure in a track width direction after formation of the wet-etchable mask and the hard mask;
providing at least one hard bias material after the magnetoresistive structure is defined in the track width direction, a first portion of the at least one hard bias material being substantially adjacent to the magnetoresistive structure in the track width direction; and
removing the wet-etchable sensor portion and the wet-etchable line frame, thereby removing a second portion of the at least one hard bias material residing on the wet-etchable sensor portion and on the wet-etchable line frame.

2. The method of claim 1 wherein the step of forming the mask further includes:
transferring the pattern of the wet-etchable mask to the hard mask layer to form the hard mask.

3. The method of claim 2 wherein the additional hard mask layer is a Cr layer and wherein the step of patterning the wet-etchable layer further includes:
providing a photoresist mask having the pattern and covering a first portion of the ARC layer corresponding to the sensor portion and the line frame of the hard mask;
transferring the pattern of the photoresist mask to the ARC layer and the Cr layer; and
transferring the pattern of the Cr layer to the wet-etchable layer.

4. The method of claim 1 wherein the step of providing the hard mask layer further includes:
depositing at least one of a SiC layer, an amorphous carbon layer, and a diamond-like carbon layer.

5. The method of claim 1 further comprising:
performing a chemical mechanical planarization (CMP) of the magnetic transducer after the wet-etchable sensor portion and the wet-etchable line frame are removed.

6. The method of claim 1 wherein further including:
performing a reactive ion etch (RIE) to remove a remaining portion of the hard mask after the wet-etchable line frame and wet-etchable sensor portion are removed.

7. The method of claim 1 wherein the step of defining the magnetoresistive structure in the track width direction further includes:
ion milling the magnetic transducer, the wet-etchable layer being a stop layer for the ion milling.

8. The method of claim 1 further comprising:
providing a capping layer on the at least one hard bias material.

9. The method of claim 8 wherein the step of providing the capping layer further includes:
providing a plurality of sub-layers, the plurality of sub-layers further including at least one of a bilayer and a trilayer, the bilayer includes a Ta sub-layer and a Ru sub-layer on the Ta sub-layer, the trilayer including the Ta sub-layer, the Ru sub-layer and an additional Ta sub-layer on the Ru sub-layer.

10. The method of claim 1 wherein the magnetoresistive structure is a tunneling magnetoresistive sensor.

11. The method of claim 1 wherein the line frame has a width of not more than two hundred nanometers.

12. The method of claim 1 wherein the step of removing the wet-etchable sensor portion and the wet-etchable line frame further includes:
wet etching the wet-etchable sensor portion and the wet-etchable line frame in an etching solution, the line frame and sensor portion of the hard mask being insensitive to the etching solution; and
lifting-off the second portion of the hard bias material.

13. The method of claim 12 wherein the etching solution includes at least one of photoresist developer, sodium hydroxide plus EDTA, and potassium hydroxide.

14. The method of claim 1 wherein the step of removing the wet-etchable sensor portion and the wet-etchable line frame further includes:
performing a wet etch and lift-off process substantially simultaneously, thereby removing the wet-etchable sensor portion, the wet-etchable line frame and the second portion of the hard bias material.

15. The method of claim 14 wherein the wet etch and lift off process at least one of photoresist developer, sodium hydroxide plus EDTA, and potassium hydroxide.

16. The method of claim 12 wherein the step of removing the wet-etchable sensor portion and the wet-etchable line frame further includes:
milling the transducer open at a nonzero angle from a normal to a surface of the transducer, thereby exposing a sidewall portion of the wet-etchable mask;
depositing an additional wet-etchable layer; and
planarizing the transducer, the steps of milling, depositing, and planarizing the transducer.

17. The method of claim 1 further comprising;
providing an insulator after the magnetoresistive structure is defined and before the at least one hard bias material is provided.

18. A method for fabricating a magnetic transducer having a device region, a field region, and a magnetoresistive stack, the method comprising:
providing a hard mask layer on the magnetoresistive stack, the hard mask layer including SiC;
providing a wet-etchable layer on the hard mask layer, the wet-etchable layer including aluminum oxide;
depositing a Cr layer on the wet-etchable layer;
depositing an antireflective coating (ARC) layer on the Cr layer;
providing a photoresist mask having a pattern;
transferring the pattern to the ARC layer and the Cr layer;

transferring the pattern of the photoresist mask to the wet-etchable layer using an aluminum oxide reactive ion etch (RIE) to provide a wet-etchable mask, the wet-etchable mask having a wet-etchable sensor portion and a wet-etchable line frame;

transferring the pattern to the hard mask layer using a SiC RIE to form a hard mask, the hard mask including a sensor portion and a line frame, the sensor portion covering a first portion of the magnetoresistive stack corresponding to a magnetoresistive structure and the line frame covering a second portion of the magnetoresistive stack in the device region, the wet-etchable sensor portion residing on the sensor portion of the hard mask, the wet-etchable line frame residing on the line frame of the hard mask;

ion milling the magnetic transducer to define the magnetoresistive structure in a track width direction;

providing at least one hard bias material after the ion milling, a first portion of the at least one hard bias material being substantially adjacent to the magnetoresistive structure in the track width direction;

removing the wet-etchable sensor portion and the wet-etchable line frame using an aluminum oxide wet etch, a second portion of the at least one hard bias material residing on the wet-etchable sensor portion and the wet-etchable line frame being removed;

performing a chemical mechanical planarization of the magnetic transducer after the wet-etchable sensor portion and the wet-etchable line frame are removed;

performing a SiC RIE to remove a remaining portion of the hard mask after the wet-etchable line frame and wet-etchable sensor portion are removed.

\* \* \* \* \*